US010916981B2

(12) United States Patent
Roh

(10) Patent No.: US 10,916,981 B2
(45) Date of Patent: Feb. 9, 2021

(54) PERMANENT MAGNET ROTATING DEVICE HAVING MINIMIZED COGGING TORQUE, PERMANENT MAGNET GENERATOR USING SAME, AND PERMANENT MAGNET MOTOR

(71) Applicant: Soon Chang Roh, Daejeon (KR)

(72) Inventor: Soon Chang Roh, Daejeon (KR)

( * ) Notice: Subject to any disclaimer, the term of this patent is extended or adjusted under 35 U.S.C. 154(b) by 0 days.

(21) Appl. No.: 16/034,684

(22) Filed: Jul. 13, 2018

(65) Prior Publication Data
US 2019/0006897 A1    Jan. 3, 2019

Related U.S. Application Data

(63) Continuation of application No. PCT/KR2017/000391, filed on Jan. 12, 2017.

(30) Foreign Application Priority Data

Jan. 14, 2016  (KR) .................. 10-2016-0004918

(51) Int. Cl.
*H02K 1/27*    (2006.01)
*H02K 3/48*    (2006.01)
(Continued)

(52) U.S. Cl.
CPC ............. *H02K 1/2733* (2013.01); *H02K 1/26* (2013.01); *H02K 3/48* (2013.01); *H02K 15/085* (2013.01);
(Continued)

(58) Field of Classification Search
CPC ........... H02K 1/26; H02K 3/48; H02K 1/2733
(Continued)

(56) References Cited

U.S. PATENT DOCUMENTS

2007/0090713 A1 * 4/2007 Arita .................. H02K 21/042
310/181

FOREIGN PATENT DOCUMENTS

DE    102013103665 A1 * 10/2014    ............. H02K 29/03
DE    102013103665 A1    10/2014
(Continued)

OTHER PUBLICATIONS

Handbook of Electric Motors, Toriyat et al., https://books.google.com/books?id=0Y_MBQAAQBAJ&pg=PA210&lpg=PA210&dq=rated+voltage+:+winding+turns+:+angular+speed+:+number+of+slots&source=bl&ots=aznEfd5USa&sig=ACfU3U1zYvgaFY97tu9XLY2Mfy5MbpMtCg&hl=en&sa=X&ved=2ahUKEwjlgejSqsPoAhXfhHIEHXFDD-4Q6AEwAHoECAcQA.*
(Continued)

*Primary Examiner* — Terrance L Kenerly
(74) *Attorney, Agent, or Firm* — Studebaker & Brackett PC

(57) ABSTRACT

The inventive concept relates to a permanent magnet rotating device having a minimized cogging torque, a permanent magnet generator using the same, and a motor, and more particularly, an objective of the inventive concept is to minimize a cogging torque of a permanent magnet rotating device including a stator and a rotor used in a motor or a generator by a simple combination of the number of poles and the number of slots and a proper arrangement of permanent magnets without using various conventional methods for reducing cogging torque while increasing costs. Through the inventive concept, cogging torque is minimized when a combination of the number of poles and the number of slots are adjusted, the width of lower ends of slots and a spacing distance between the permanent magnets are made
(Continued)

the same, and a proper winding method and a pitch are applied.

5 Claims, 6 Drawing Sheets

(51) Int. Cl.
    *H02K 29/03*         (2006.01)
    *H02K 15/085*     (2006.01)
    *H02K 1/26*         (2006.01)
    *H02K 21/14*       (2006.01)

(52) U.S. Cl.
    CPC ............... *H02K 29/03* (2013.01); *H02K 1/27* (2013.01); *H02K 21/14* (2013.01); *H02K 2201/06* (2013.01); *H02K 2201/09* (2013.01); *H02K 2213/03* (2013.01)

(58) Field of Classification Search
    USPC ........................................................ 310/152
    See application file for complete search history.

(56) References Cited

FOREIGN PATENT DOCUMENTS

| | | |
|---|---|---|
| JP | 2005-278268 A | 10/2005 |
| JP | 2009-201278 A | 9/2009 |

OTHER PUBLICATIONS

The extended European search report issued by the European Patent Office dated Dec. 6, 2018, which corresponds to European Patent Application No. 17738642.2.

\* cited by examiner

PERMANENT MAGNET ROTATING DEVICE HAVING MINIMIZED COGGING TORQUE, PERMANENT MAGNET GENERATOR USING SAME, AND PERMANENT MAGNET MOTOR

CROSS-REFERENCE TO RELATED APPLICATIONS

The present application is a continuation of International Patent Application No. PCT/KR2017/000391, filed on Jan. 12, 2017, which is based upon and claims the benefit of priority to Korean Patent Application No. 10-2016-0004918, filed on Jan. 14, 2016. The disclosures of the above-listed applications are hereby incorporated by reference herein in their entirety.

BACKGROUND

Embodiments of the inventive concept described herein relate to a permanent magnet rotating device having a minimized cogging torque, and a permanent magnet generator using the same, and a permanent magnet motor, and more particularly, to a permanent magnet rotating device having a minimized cogging torque through a winding method of generating a waveform that is maximally close to a sine wave in simple consideration of a combination of the numbers of poles and slots, an proper arrangement of permanent magnets, and phase angles and waveforms without using various conventional methods for reducing cogging torque, by which costs, for example, for skewing and tooth machining, are increased, and a permanent magnet generator using the same, and a permanent magnet motor.

In recent years, many studies have been made in the field of renewable energy to reduce an amount of discharged carbon dioxide, which is a main cause of global warming.

In particular, the wind power generation field, in which electric power may be obtained by installing generators with low costs at any place where there is wind, has continuously grown.

Although wind generators, on which gear type induction generators are mounted, have been mainly used in the overland large-scale wind power generation, the wind power generation market is reorganized from the gear type synchronous generators that require high maintenance costs to gearless permanent magnet generators that require low maintenance costs as the oversea wind power generation market has rapidly grown.

In particular, in the small-scale wind power generation having a severe output change, permanent magnet generators that require low RPM and high torque are mostly used.

However, it is difficult to initially operate the permanent magnet generators of low RPM and high torque as cogging torque is high due to the high magnetic flux density of the permanent magnets and an unbalance of the magnetic fields of the cores and the permanent magnets.

Accordingly, in recent years, in order to minimize driving torque and cogging torque in the small-scale wind generators to allow driving of blades even at a low wind speed, coreless axial flux permanent magnet (AFPM) type generators with no core or slot-less radial flux permanent magnet (RFPM) type generators with no slot have increasingly used.

However, the coreless axial flux permanent magnet (AFPM) type generators with no core or the slot-less radial flux permanent magnet (RFPM) type generators with no slot show low output voltages and low efficiencies due to their high magnetic flux leakages as compared with radial flux permanent magnet (RFPM) type generators with slots.

Further, as the structures are complex and the numbers of permanent magnets used increase, manufacturing costs increase, and they cannot be made large-scaled due to the structural problems of the generators themselves.

The radial flux permanent magnet (RFPM) type generators with slots have simple structures and have high output voltages and efficiencies, and may be made small-scaled and light-weighted, but they cannot be easily initially operated due to their high cogging torques and generate vibration even when they are in normal operation.

In recent years, operations of minimizing cogging torque by applying the BLDC motor technology to RFPM generators to use the RFPM generators with slots in the wind generators are performed, but multiplying gears have to be used as in synchronous generators because the RFPM generators with slots are mostly high RPM.

A cogging torque may be defined as a pulsation torque that is generated by a tendency of maintaining reluctance at a minimum value in a magnetic circuit including a rotor permanent magnet, a stator core, and an aperture, and generally may be referred to as a difference between a maximum value and a minimum value of a torque generated due to an unbalance of magnetic fields when the rotor is driven in a permanent magnet generator or a permanent magnet motor.

In recent years, as the demands on the super-premium motors using permanent magnets have been increasing, various for reducing cogging torque that is a main cause of vibration and noise have been suggested, and the methods for reducing cogging torque, which have been used until now, include increasing the length of an aperture, increasing the number of slots and the number of poles, using an auxiliary slot, changing the shape of teeth of a stator, skewing a stator or an armature, using fractional slots or poles, decreasing the width of slots, changing the shapes of magnets, changing the magnetization of poles, using magnets of low magnetic flux densities, and adjusting arc faction.

However, the above-mentioned methods for reducing cogging torque are main factors of decreasing the output and efficiency of the permanent magnet motors and the permanent magnet generators or increasing manufacturing costs.

Accordingly, development of the methods for reducing cogging torque, by which the decrease of the output and efficiency of the permanent magnet motors and the permanent magnet generators are minimized and manufacturing costs are prevented from being increased.

SUMMARY

The inventive concept has been made in an effort to solve the above-mentioned problems, and provides a permanent magnet rotating device that improves a combination of the number of poles and the number of slots and a spacing distance between permanent magnets inserted into a rotor and properly designing the cross-sectional area of coils and the number of turns (winding) of the coils to significantly reduces vibration and noise by minimizing cogging torque while maximizing output and efficiency without increasing manufacturing costs.

The inventive concept also provides a line-start permanent magnet synchronous motor by making initial driving of a permanent magnet motor easy by decreasing an initial driving torque due to cogging torque.

In accordance with an aspect of the inventive concept, there is provided a permanent magnet rotating device having a minimized cogging torque, the permanent magnet rotating device including: a shaft 110; a rotor 200 in which a shaft is coupled to the center thereof and a plurality of permanent magnets 210 are formed at a specific interval; and a stator core 300 having a plurality of slots 310 formed at a specific interval and having slots on which coils are wound, wherein the number of poles of the permanent magnets and the number of the slots are determined by calculation equation 1, wherein a spacing distance (a) of the permanent magnets 210 of the rotor 200 is 70% to 130% of a width (b) of lower ends of teeth of the stator core 300, wherein the winding of the stator core 300 is made such that parts in which two coils of coils of phases are successively wound are arranged to face each other, and the parts in which two coils of the coils of the plurality of phases are successively wound are spaced apart from adjacent ones of the coils of the plurality of phases by 60°, and a pitch of the coils is 5, wherein a rated current per a cross-sectional area of 1 mm² of the wound coils is 6 A, and wherein the number of turns of the winding is determined in calculation equation 1.

$P=S/3-2$ ($P$: the number of poles, $S$: the number of slots) [Equation 1]

Number of turns (of winding)={rated voltage ($Vac$)× $K$}/{angular speed (rad/s)×magnetic flux density ($T$)}/number ($S$) of slots of stator corer/length ($mm$) of stack of stator core [Equation 2]

(K is a constant and is a value ranging from 0.84 to 1.56).

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, the inventive concept will be described in detail with reference to the drawings and the detailed embodiments.

Figure 1:
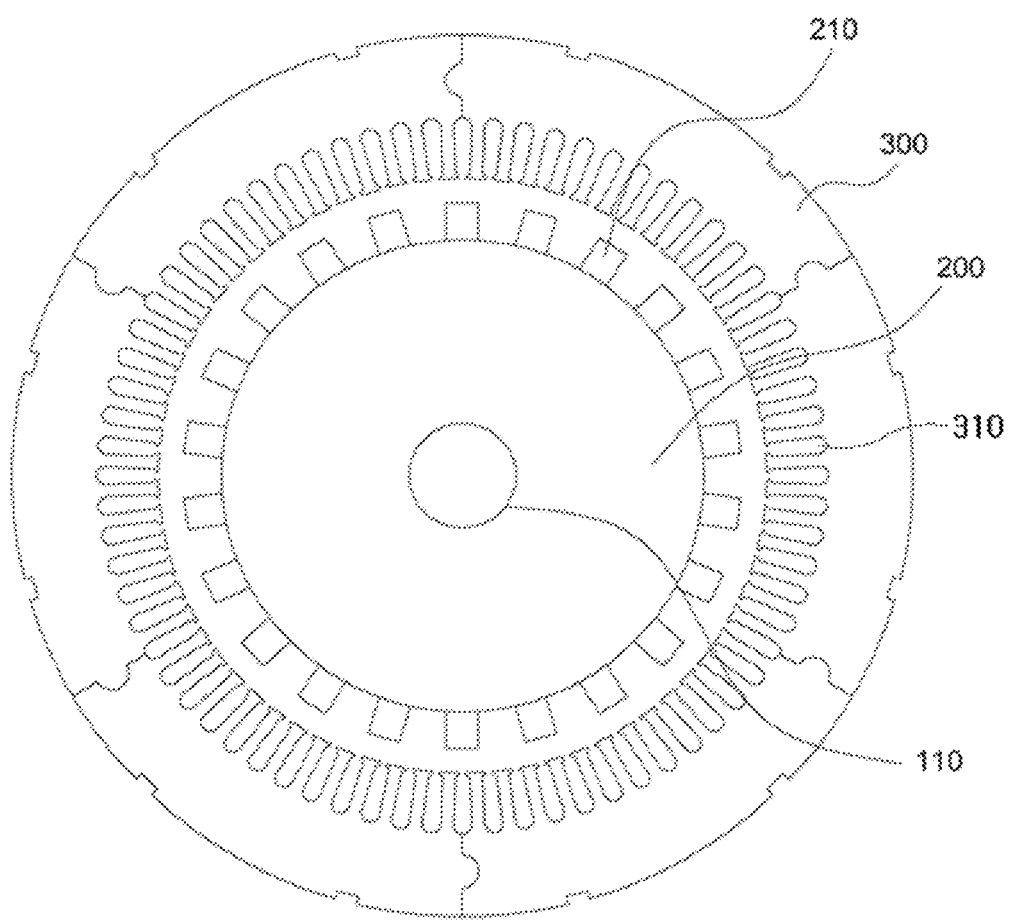
FIG. 1 is a cross-sectional view schematically illustrating a permanent magnet rotating device for minimizing cogging torque according to an embodiment of the inventive concept.

As illustrated in FIG. 1, a permanent magnet rotating device for minimizing cogging torque, and a permanent magnet generator and a permanent magnet motor using the same according to the inventive concept includes: a shaft 110; a rotor in which a shaft is coupled to a center thereof and having a plurality of permanent magnets 210 formed at a specific interval; and a stator core 300 having a plurality of slots 310 formed at a specific interval and in which coils are wound in slots, respectively, and the number of the permanent magnets and the number of the slots are determined by the following equation to minimize cogging torque.

$P=S/3-2$ [Equation]

In the equation, P denotes the number of poles and S denotes the number of slots.

In general, a permanent magnet generator and a permanent magnet motor are designed largely according to six factors, and the first is a combination of the number of slots and the number of poles, the second is a spacing distance between magnets, the third is a winding method, the fourth is a pitch of coils, the fifth is a cross-sectional area of the coils, and the six is the number of turns of the coils.

Because there occurs a remarkable difference in cogging torque, if output density, efficiency, power factor, vibration, and the like of any one of the six factors are designed wrongly, it is important to design the permanent magnet generator and the permanent magnet motor consistently as a whole.

A permanent magnet rotating device for minimizing cogging torque, and a permanent magnet generator and a permanent magnet motor using the same according to the inventive concept are basically constituted by the six factors, and may be designed consistently regardless of the capacities of the permanent magnet motor and the permanent magnet generator.

The first method is a method for reducing cogging torque through a combination of the number P of poles and the number S of slots.

According to the conventional technologies released until now, methods for reducing cogging torque through various combinations of the number of poles and the number of slots have been suggested, but it is described only that cogging torque may be reduced by increasing the number of poles and the number of slots or increasing the least common multiple of the number of poles and the number of slots.

The cogging torque becomes maximal when the number of poles and the number of slots are the same, when the center of the permanent magnets and the center of the teeth coincide with each other, or when the number of slots is a multiple of the number of poles such that the slots are located symmetrically leftwards and rightwards from the center of the permanent magnets, and then the attractive forces between the permanent magnets and the slots becomes most stable.

Accordingly, in order to minimize cogging torque, the center of the teeth is made to deviate from the left/right symmetrical location of the center of the permanent magnets by changing the stable arrangements of the attractive forces between the permanent magnets and the slots to unstable arrangements.

Among various combinations of the number of poles and the number of slots, the combination having the lowest cogging torque is a combination in which the least common multiple of the number of poles and the number of slots is highest.

However, even though the least common multiple of the number of poles and the number of slots is the highest, a proper combination may not be achieved when 3-phase winding that is employed in most of the generators or the motors is difficult or impossible.

Accordingly, in order to minimize cogging torque, a combination of the number of poles and the number of slots which has the highest least common multiple while allowing 3-phase winding may be required.

In order to allow 3-phase winding and minimize an unbalance of magnetic fields, the number of slots has to be both a multiple of 3 and an even number.

The number P of poles that may minimize cogging torque as it both allows 3-phase winding and has the highest least common multiple is S/3−2 (S is the number of slots) as in the equation when it is assumed that the number of slots which is both a multiple of 3 and an even number is S.

Then, as the least common multiple becomes larger in the combination, the cogging torque becomes much smaller.

FIG. 1 of the inventive concept exemplifies a rotating device having 72 slots, and the number of poles is 22 through the equation of P=S/3−2. Meanwhile, a combination (P(S/3−2):S) of the number of poles and the number of slots that allows 3-phase winding while the least common multiple of the number of poles and the number of slots is high is made, but the cogging torque cannot be completely removed only with the combination.

That is, conventionally, cogging torque may be reduced by using the technique of skewing permanent magnets or stator cores or adjusting an arc fraction that is a ratio of the width of a magnets and the pitch of the magnets, and these methods also act as factors of decreasing output and efficiency and increasing manufacturing costs.

Accordingly, the inventive concept solves the problem by using a width (b) of lower ends of teeth between slots 310 and a spacing distance (a) between the permanent magnets to minimize cogging torque through a method that maintains output and efficiency and does not increase manufacturing costs.

Figure 2:
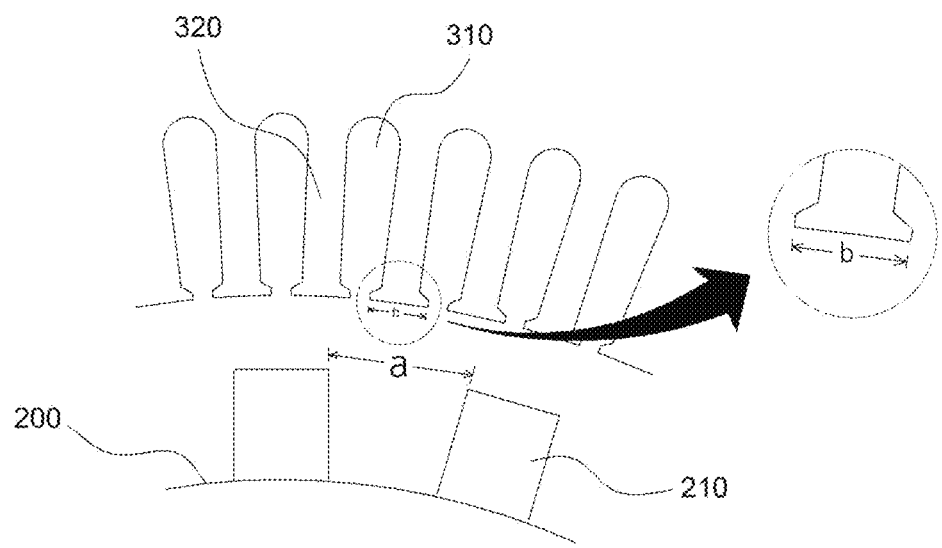
FIG. 2 is an exemplary view illustrating a width of a lower end of a tooth and a spacing distance between magnets of a permanent magnet rotating device for minimizing cogging torque according to an embodiment of the inventive concept.

That is, as illustrated in FIG. 2, the spacing distance (a) between the permanent magnets are made to become 70% to 130% of the width (b) of the lower ends of the stator cores 300, and more preferably, the ratio of the spacing distance (a) between the permanent magnets and the width (b) of the lower ends of the teeth of the stator core 300 is 1:1.

In detail, the teeth 320 is formed in the stator core 300, and the lower ends of the teeth constitutes the width (b) of the lower ends as illustrated in FIG. 2.

If the width of the lower ends of the teeth is located between the permanent magnets that constitute a rotor, a repulsive force is generated between the lower ends of the teeth and the rotor so that the rotor is moved in one direction by itself.

Accordingly, the cogging torque is minimized by increasing zones in which repulsive forces are generated regardless of the location of the rotor.

In other words, parts in which spacing between the magnets is located below the width of the lower ends of the teeth have to be larger regardless of the location of the rotor.

If the width of the lower ends of the teeth and the spacing distance between the magnets are made to be the same in the combination of the number of poles and the number of slots suggested by the inventive concept, a zone in which a repulsive force is generated is maximized and cogging torque is minimized.

Then, the zone in which the repulsive force is generated is proportional to the number of poles, and cogging torque is minimized as the zone in which the repulsive force is generated increases if the number of poles is large and cogging torque is minimized as the zone in which the repulsive force is generated decreases if the number of poles is small.

Accordingly, it is preferable that S is 30 or more to minimize cogging torque in the equation of P=S/3−2, but cogging torque may be minimized even when S is designed to be less than 30 according to the size, the output, and the like of the generator or the motor.

Meanwhile, it is most ideal to set the ratio of the spacing distance (a) between the permanent magnets and the width (b) of the lower ends of the teeth to 1:1, but when it is difficult in design, it is preferable that the spacing distance (a) between the permanent magnets be within a range of 70% to 130% of the width (b) of the lower ends of the teeth.

If the spacing distance (a) between the permanent magnets deviates from the range of 70% to 130%, a cogging torque reducing effect significantly deteriorates.

For example, when the width (b) of the lower ends of the teeth is 10 mm, the spacing distance (a) between the permanent magnets has to be set to a range of 7 mm to 13 mm, and outside the range, the cogging torque reducing effect deteriorates.

Meanwhile, driving and operations of the motor and the generator are impossible or the outputs and efficiencies of the motor and the generator significantly decrease if winding is not proper even though the rotors and the stator cores of the motor and the generator are properly designed.

The combination of the numbers of poles and the slots and the spacing distance between the magnets, which have been discussed until now, are hardware concepts that determine the structures of the generator and the motor.

On the other hand, in designing a generator and a motor, a winding method, the pitch of coils, the cross-sectional area of the coils, and the number of turns (the number of winding) of the coils are software concepts and are very important in determining output density, efficiency, power factor, and vibration.

In particular, in a modified combination of the numbers of slots and poles other than the combination of the number of slots and poles that realizes a phase angle of 120°, a winding method is very important.

The winding is rather different for the manufacturers of motors and generators even in the case of the same combination of the numbers of slots and poles, and this is because a specific rule is not set to the winding method but winding is made mostly by experiential know-hows.

In general, the permanent magnet generator or the permanent magnet motor is based on 3-phase winding except for special cases.

Figure 3:
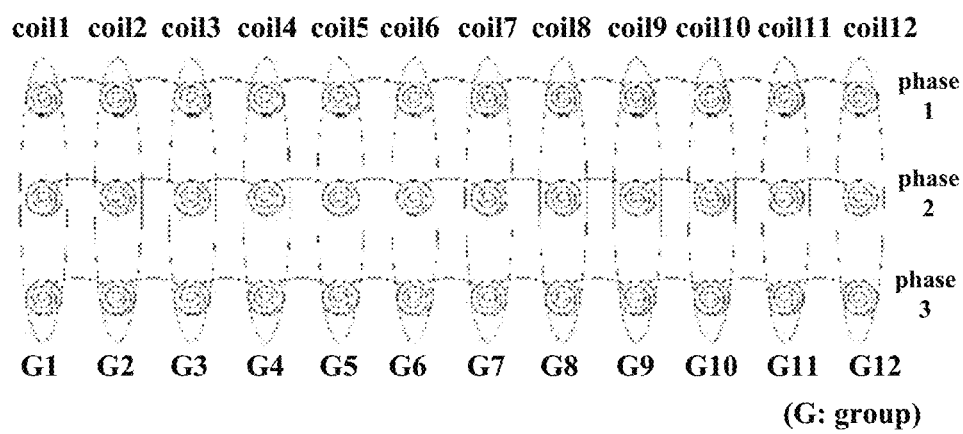
FIG. 3 is an exemplary view illustrating a conventional 3-phase winding method.
Figure 3:
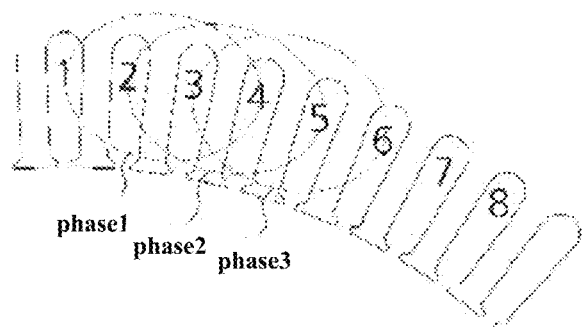

FIG. 3 illustrates a conventional 3-phase winding method and exemplifies a winding method of 36 slots and 12 poles.

Because the phase angles of the phases are a constant value of 120°, the magnetic fields are in an equilibrium state and symmetrical so that output and efficiency becomes highest and vibration and noise is minimized.

In order to make the phase angles of the phases 120°, it is ideal to make the number of poles one thirds of the number of slots accurately.

Accordingly, if the number of slots is 36, they are wound with 12 poles, if the number of slots is 48, they are wound with 16 poles, and if the number of slots is 72, they are wound with 24 poles.

Further, the number of poles corresponding to one thirds of the number of slots is the number of poles for basic 3-phase winding of 120 degrees in 3-phase winding, but if the basis number of poles is divided by 2 or 3 and the result is an even number, the number of poles also allows 3-phase winding.

For example, because the basic number of poles that allows 3-phase winding having a phase angle of 120 degrees when the number of slots is 24 is 8 that is one thirds of the number of slots, and if the basic number of poles of 8 is divided by 2, the number of poles is 4 and if the number of poles of 4 is divided by 2, the number of poles is 2, the numbers of poles that allow 3-phase winding in 24 slots are 8, 4, and 2. Then, the phase angle of the four poles is 60 degrees and the phase angle of the two poles is 30 degrees so that RPM increases by two times and four times at the same frequency.

If the case of 36 slots is calculated with the same principle, the numbers of poles that allow 3-phase winding are 12, 6, and 2.

Because most of the induction motors use 12 slots, 24 slots, 36 slots, and 48 slots, the number of poles that allow 3-phase winding is 2, 4, 6, and 8.

As illustrated in FIG. 3, because 12 poles are necessary for 3-phase winding in the case of 36 slots, as illustrated in FIG. 3, coil 1 of the coil of phase 1, coil 1 of the coil of phase 2, and coil 1 of the coil of phase 3 constitute one group when the pitch is 4 and 3-phase winding having a phase angle of 120 degrees is completed by winding coil 1 of the coil of phase 1 on slots 1 to 4, by winding coil 1 of the coil of phase 2 on slots 2 to 5, by winding coil 1 of the coil of phase 3 on slots 3 to 6 until the final twelfth group is wound so that 3-phase winding having a phase angle of 120 degrees is completed.

The 3-phase winding method is a generally known technology, and may be sufficiently understood by the description.

However, because the number of poles becomes different if the conventional 3-phase winding method is applied to winding as it is in winding for various combinations of the number of poles and the number of slots, by which cogging torque is minimized, according to the inventive concept, a phase angle of 120° cannot be achieved.

Accordingly, the unbalance of magnetic fields makes driving and operations of the generator and the motor impossible, rapidly decreases output and efficiency, and increases noise and vibration.

Accordingly, a winding method that is suitable for the combination of the number of poles and the number of slots, which is described in the inventive concept, is necessary, and it is the core of the winding method of the inventive concept to maintain output and efficiency, vibration, and noise at the same level as that of the conventional 3-phase winding method while realizing a phase angle at an angle that is close to 120°.

The winding method that is suitable for the combination of the number of poles and the number of slots, by which cogging torque is minimized, according to the inventive concept basically corresponds to long articulation winding in which the pitch of the coils is larger than the pitch of magnetic poles, distributed winding in which coils are wound on two or more slots, and double layer winding in which the number of coils is the same as the number of slots.

Figure 4:
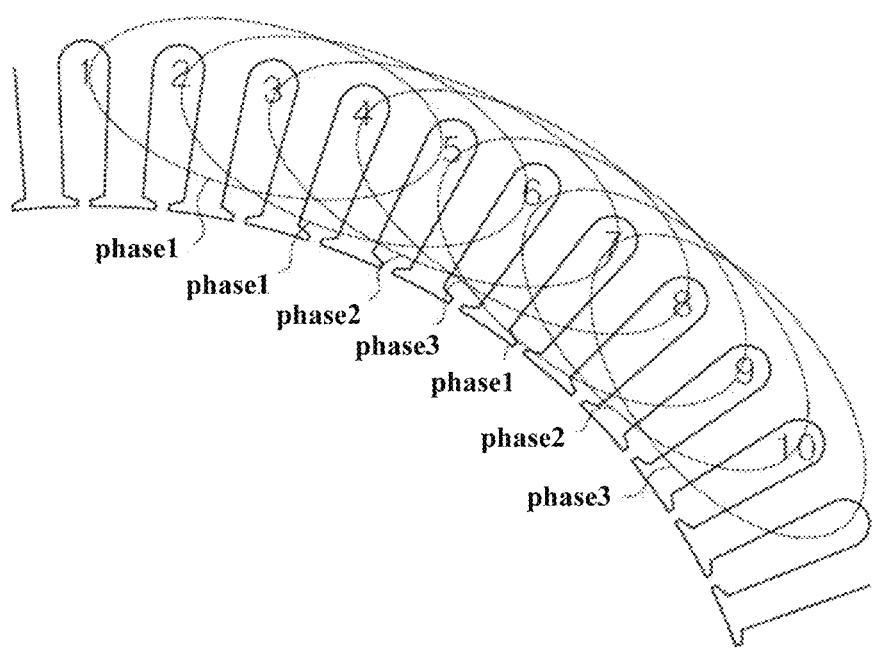
FIG. 4 is an exemplary view illustrating a winding method of a permanent magnet rotating device for minimizing cogging torque according to an embodiment of the inventive concept.
Figure 5:
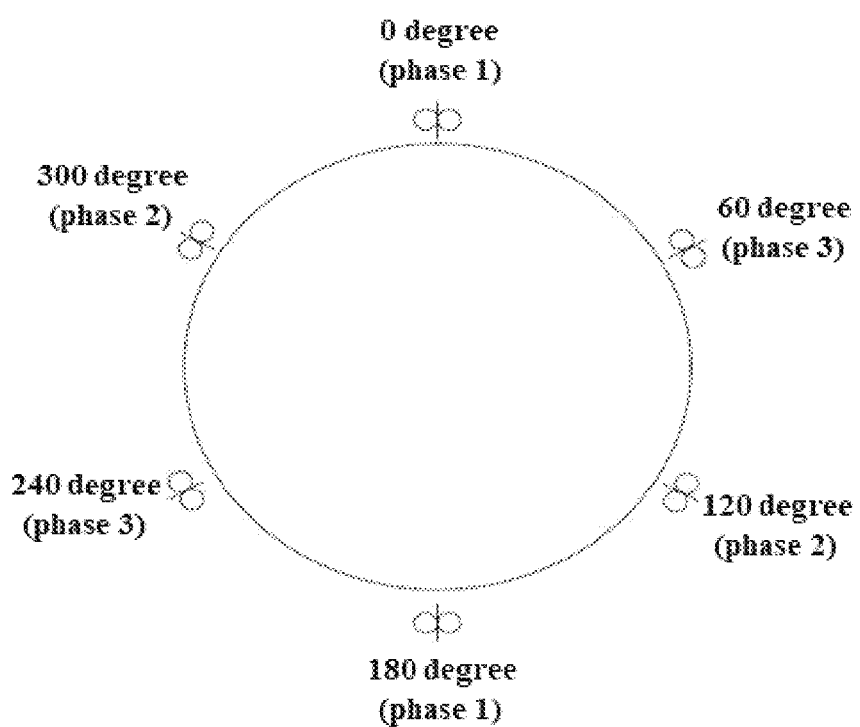
FIG. 5 is an exemplary view illustrating an example in which among coils of phases wound through a 3-phase winding method, in which parts in which two coils are successively wound face each other at 180 degrees.

FIGS. 4 and 5 are exemplary views illustrating the winding method of the inventive concept.

In detail, FIG. 4 will be referenced for the description.

When the pitch of the coils 5 is, the winding of group 1 is finished by winding coil 1 of the coil of phase 1 on slots 1 to 5, winding coil 2 of the coil of phase 1 on slots 2 to 6, winding coil 1 of the coil of phase 2 on slots 3 to 7, and winding coil 1 of the coil of phase 3 on slots 4 to 8.

Thereafter, the winding of group 2 is finished by winding coil 2 of the coil of phase 1 on slots 5 to 9, winding coil 2 of the coil of phase 2 on slots 6 to 10, winding coil 2 of the coil of phase 3 on slots 7 to 11, and winding coil 3 of the coil of phase 3 on slots 8 to 12. The winding of group 3 is finished by winding coil 4 of the coil of phase 2 on slots 9 to 13, winding coil 3 of the coil of phase 3 on slots 10 to 14, and winding coil 4 of the coil of phase 3 on slots 11 to 15. The winding of group 4 is finished by winding coil 5 of the coil of phase 1 on slots 12 to 16, winding coil 4 of the coil of phase 2 on slots 13 to 17, winding coil 5 of the coil of phase 2 on slots 14 to 18, and winding coil 5 of the coil of phase 3 on slots 15 to 19. Group 5 is finished by winding coil 6 of the coil of phase 1 on slots 16 to 20, winding coil 6 of the coil of phase 2 on slots 17 to 21, and winding coil 6 of the coil of phase 3 on slots 18 to 22.

If the intervals of parts in which two coils of a coil of each of the phases are successively wound sequentially in this way are the same, an angle at which the parts in which the two coils of the coil of each of the phases are successively wound is 60 degrees and the group in which two parts in which two coils of the coil of the same phase are successively wound are disposed are essentially symmetrical by 180 degrees. Then, the winding sequences of the groups in which two coils of the coils of the phases are successively wound may be disposed at a specific interval in the sequence of phase 1, phase 3, and phase 2.

Then, the number of the groups in which the parts in which the two coils of the coils of the phases are successively wound are disposed is a constant value of 6, and the sequences thereof vary according to a combination of the number of slots and the number of poles. For example, in a combination of the ratio of the number of slots and the number of poles of 36:10, the number of groups in which parts in which two coils are successively wound are disposed is 6 and the sequence in which parts in which two coils of the coils of the phases are successively wound are disposed is phase 1, phase 3, and phase 2, and the number of groups in which parts in which two coils of the coils of the phases are successively wound are disposed is 6 in a combination of the ratio of the number of slots and the number of poles of 48:14 but the sequence in which parts in which two coils of the coils of the phases are successively wound are disposed is phase 1, phase 2, and phase 3, and this is for the purpose of maintaining the groups in which parts in which two coils of the coils of the phases are successively wound are disposed at an angle of 60°. As a result, the winding method of the inventive concept is finished by performing the winding by using the above-mentioned winding method.

Referring to FIG. 5, parts in which two coils of the coil of phase 1 are successively wound are disposed at 0 degrees and 180 degrees that face each other, parts in which two coils of the coil of phase 3 are successively wound are disposed at 60 degrees and 240 degrees that face each other, and parts in which two coils of the coil of phase 2 are successively wound are disposed at 120 degrees and 300 degrees that face each other. Further, the groups in which the parts in which the two coils of the coils of the phases are successively wound are disposed are arranged in the sequence of phase 1, phase 3, and phase 2.

Here, the winding method of a permanent magnet motor having a combination of a ratio of the number of slots and the number of poles of 36:10 will be discussed again as follows.

First, 3-phase winding is used and ten groups are formed by constituting one group with phases 1 to 3, and in group 1, coils 1 to 2 of the coil of phase 1, coil 1 of the coil of phase 2, and coil 1 of the coil of phase 3 are sequentially wound, in group 2, coil 3 of the coil of phase 1, coil 2 of the coil of phase 2, and coils 2 to 3 of the coil of phase 3 are sequentially wound, in group 3, coil 4 of the coil of phase 1, coil 3 of the coil of phase 2, and coil 4 of the coil of phase 3 are sequentially wound, in group 4, coil 5 of the coil of phase 1, coils 4 to 5 of the coil of phase 2, and coil 5 of the coil of phase 3 are sequentially wound, in group 5, coil 6 of the coil of phase 1, coil 6 of the coil of phase 2, and coil 6 of the coil of phase 3 are sequentially wound, in group 6, coils 7 to 8 of the coil of phase 1, coil 7 of the coil of phase 2, and coil 7 of the coil of phase 3 are sequentially wound, in group 7, coil 9 of the coil of phase 1, coil 8 of the coil of phase 2, and coils 8 to 9 of the coil of phase 3 are sequentially wound, in group 8, coil 10 of the coil of phase 1, coil 9 of the coil of phase 2, and coil 10 of the coil of phase 3 are sequentially wound, in group 9, coil 11 of the coil of phase 1, coils 10 to 11 of the coil of phase 2, and coil 11 of the coil of phase 3 are sequentially wound, and in group 10, coil 12 of the coil of phase 1, coil 12 of the coil of phase 2, and coil 12 of the coil of phase 3 are sequentially wound.

In this way, in the winding method of the rotating device having a minimized cogging torque, the permanent magnet generator using the same, and the permanent magnet motor, it is preferable that the marginal coils left due to a decrease of the number of poles be properly arranged at a specific interval such that the phase angles of the phases are maintained similarly and an unbalance of the magnetic fields is minimized.

In the conventional 3-phase winding, the number of coils for each of the phases is the number (S) of slot/3.

That is, the number of the coils of phase 1 is S/3, the number of the coils of phase 2 is S/3, and the number of coils of phase 3 is S/3 so that the total sum of the numbers of the coils of phase 1, phase 2, and phase 3 is the number (S) of the slots.

However, the number of poles that are variously derived by the calculation equation suggested by the inventive concept is always smaller than the number of poles that allow the 3-phase winding by 2. Accordingly, if the winding is made by the conventional 3-phase winding method, the number of the poles of the rotor is S/3−2 and the number of poles of the winding of the stator core is S/3 so that driving and operations of the motor and the generator become impossible due to an unbalance of magnetic fields or output and efficiency deteriorate.

Accordingly, the number of the poles of the stator core has to be S/3−2, and it is impossible to make the number of the coils of the phases S/3−2 to make the number of poles S/3−2.

This is because the coils are wound in an unbalanced manner as the total number of the coil bundles is (S/3−2)*3, which is always smaller than the number of the slots of the stator core by 6, if the number of the coils of each of the phases is S/3−2.

Even in the winding of a combination ratio of the number of slots to the number of poles, which minimizes a cogging torque of the inventive concept, the numbers of the coils of the phases are the number (S) of the slots/3.

In order to wind S/3 coils for the phases with S/3−2 poles, the groups in which the parts in which two coils of the coil of the same phase are successively wound are disposed have to be distributed at a proper angle, and as illustrated in FIG. 5, the ideal angles are angles at which the two parts face each other.

That is, the groups in which parts in which two coils of the coil of phase 1 are successively wound are disposed face each other at 180°, the groups in which parts in which two coils of the coil of phase 2 are successively wound are disposed face each other at 180°, and the groups in which parts in which two coils of the coil of phase 3 are succes-sively wound are disposed face each other at 180°, and then, the angles of the groups in which parts in which two coils of the coils of the phases have to be maintained at 60°, in which case the sequence may be phase 1, phase 2, and phase 3, or phase 1, phase 3, and phase 2.

FIG. 4 is an exemplary view of the winding method of the inventive concept, which has been described above, and FIG. 5 is an exemplary view illustrating that the groups in which parts in which two coils of the coil of the same phase are successively wound are disposed to face each other at 180 degrees and the angles of the groups in which parts in which two coils of the coils of the phases are successively wound are disposed are 60°.

FIG. 4 illustrates an example of winding to which a combination ratio of the number of slots to the number of poles of 72:14, and illustrates only the winding method for poles 1 and 2 for pole 1: phase 1, phase 1, phase 2, and phase 3 and for pole 2: phase 1, phase 2, and phase 3 and does not illustrate the winding method for poles 3 to 14.

In the combination of the number of slots and the number of poles according to the inventive concept, the winding method of the principle is applied in the same manner.

Through the winding method, output and efficiency may be maximized and vibration may be minimized owing to a balance of magnetic fields.

In the device for minimizing cogging torque according to the inventive concept, cogging torque is minimized when the pitch of coils is 5 regardless of the combination of the number of slots and the number of poles.

Figure 6:
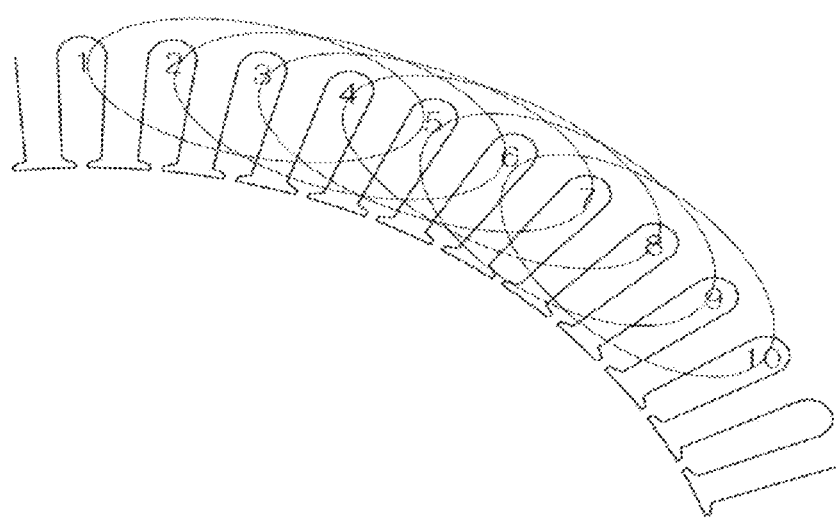
FIG. 6 is an exemplary view illustrating a coil pitch of the inventive concept.

FIG. 6 is an exemplary view of winding in which the pitch of coils is 5.

The pitch of coils refers to a distance between winding and next winding in winding a coil, and is generally represented by the number of slots.

The coil pitch also is not determined by a specific rule, but is designed slightly differently by the number of slots, the number of poles, and the inner diameter of the stator core.

Even in the combination of the number of poles and the number of slots, which are derived by the calculation equation suggested by the inventive concept, various coil pitches may be designed in consideration of the number of slots, the number of poles, and the inner diameter of the stator core.

However, in the combination of the number of poles and the number of slots, which are derived by the calculation equation suggested by the inventive concept, output and efficiency may be maximized when the coil pitch is always designed to be 5 regardless of the number of slots, the number of poles, and the inner diameter of the stator core.

Accordingly, the combination of the number of poles and the number of slots, which are derived by the calculation equation of the number of poles and the number of slots of P=S/3−2, which is suggested by the inventive concept, and the coil pitch of 5 have a specific rule.

In designing the generator and the motor, the cross-sectional area of the coils and the number of turns (winding) of the coils also are very important factors to determine the performances of the generator and the motor.

In recent years, design programs for the generator and the motor are variously released so that the cross-sectional area of the coils and the number of turns of the coils may be simply obtained as long as only various parameters are input.

The conventional design programs are programs that are designed in consideration of parameters that have been known until now, so they are not suitable for design programs for the permanent magnet generator and the permanent magnet motor suggested by the inventive concept, which have a structure that generates a repulsive force.

It can be seen that outputs and efficiencies are greatly different as various experimental results of the cross-sectional areas of the coils and the numbers of the turns of the coils in the rotating device, the permanent magnet motor using the same, and the permanent magnet generator, which are suggested by the inventive concept.

Accordingly, in the rotating device, the permanent magnet motor using the same, and the permanent magnet generator, which are suggested by the inventive concept, it is preferable that the cross-sectional area of the coils and the number of turns of the coils be determined in the following method.

The cross-sectional area of the coils is a parameter for determining a magnitude of current, and is generally indicated by a unit of $mm^2$ and an amount of currents per 1 $mm^2$ is designed.

In the inventive concept, when a rated current of 6 A per 1 mm2 is designed, output and efficiency are highest.

That is, if the rated current is 6 A in the permanent magnet generator the permanent magnet motor, the cross-sectional area of the coils of phase 1, phase 2, and phase 3 has only to be designed to be 1 $mm^2$.

Then, the number of turns (winding) of the coils is determined by the following calculation equation.

Number of turns (of winding)={rated voltage (*Vac*)× *K*}/{angular speed (rad/s)×magnetic flux density (*T*)}/number (*S*) of slots of stator corer/length (*mm*) of stack of stator core Here, K denotes a constant and {rated voltage (Vac)×K}/{angular speed (rad/s)×magnetic flux density (T)} denotes a length of the coil, and all the parameters except for the constant K are basically provided in designing a generator or a motor so that a special know how is not necessary.

Meanwhile, the part corresponding to the constant K corresponds to a unique design parameter carried by the manufactures of the generator or the motor.

The constant value K becomes an important factor that determines voltage in a non-load voltage and a rate load. In general, all generators generate a voltage drop if a load is applied, and basically efficiency becomes higher as the voltage drop of the generator is lower.

Accordingly, various studies for minimizing a voltage drop have been made, and according to the inventive concept, output and efficiency may be maximized when the constant K is designed to be 1.2 with reference to 6 A per the cross-sectional area of the coil of 1 $mm^2$.

Here, it is advantageous to determine the constant to be 1.2 because output and efficiency gradually decrease as the constant K becomes farther upwards and downwards, but it is good to use the constant K with a range of 0.84 to 1.56 that correspond to a range of 70% to 130% of 1.2.

Further, the thickness of the permanent magnet 210 of the inventive concept may be selected from a range of 1 mm to 50 mm.

That is, output and efficiency are high because the magnetic flux density of the permanent magnet becomes higher as the permanent magnet becomes thicker, conventionally, there is a limit in the thickness of the permanent magnet because cogging torque becomes higher as the permanent magnet becomes thicker.

However, according to the inventive concept, because an repulsive force is generated between the rotor and the stator core 300 at a specific part as cogging torque is minimized by a width (b) of lower ends of the teeth 320 and a spacing distance (a) between the permanent magnets, cogging torque is minimized regardless of the thickness of the permanent magnets and the air gaps.

Accordingly, if the permanent magnet rotor having a suitable thickness is designed first and the stator core that is suitable for the magnetic flux density of the rotor is designed, the generator and the motor may be maximally small-sized and light-weighted.

Further, as illustrated in FIG. 3, the air gap (c) between the permanent magnet of the rotor 200 and the width (b) of the lower ends of the stator core 300 has to be set to range of 0.1 mm to 2 mm, and output and efficiency deteriorate if the value deviates the range.

If the rotating device is constituted in this way, the size and the weight of the generator or motor may be significantly reduced as compared with those of the conventional generator or motor of the same capacity.

The methods for fixing permanent magnets to a rotor include a surface mounted permanent magnet (SPM) type and an interior permanent magnet (IPM) type, and the methods suggested by the inventive concept are the same regardless of the surface mounted permanent magnet type or the interior permanent magnet type.

If the rotating device that minimizes cogging torque according to the inventive concept and the permanent magnet motor and the permanent magnet generator that satisfy the pitch, the winding method, and the winding specifications according to the inventive concept at the same time are manufactured, output density increases, efficiency increases, and vibration and noise decrease, and a new phenomenon that cannot be achieved in the conventional permanent magnet synchronous motor is generated as well.

Among them, the most representative phenomenon of a line-start that is known to be impossible in a permanent synchronization motor becomes possible in the permanent magnet synchronous motor suggested by the inventive concept.

The line-start motor refers to a motor that may be driven and operated by a common power source, and a representative motor is an induction motor.

Meanwhile, a line-start is impossible in the permanent magnet synchronous motor, a driver or a sensor-less vector control inverter has to be used for driving and an operation.

However, the rotating device that minimizes cogging torque according to the inventive concept and the permanent magnet motor and the permanent magnet generator that satisfy the pitch, the winding method, and the winding specifications according to the inventive concept at the same time may be driven and operated only with a common power source line an induction motor without using a driver or a sensor-less vector control inverter.

This is because a repulsive force is generated between the rotor and the stator core by various elements suggested by the inventive concept, and the repulsive force allows an operation of the rotor only with the rotational magnetic fields generated by the stator core.

The reason why the induction motor is widely used in spite that the output density, the efficiency, and the power factor of the induction motor is lower than those of the permanent magnet synchronous motor is a relatively low price and a line-start of the induction motor.

However, the reason why the permanent magnet synchronous motor is not widely used in spite that the output density, the efficiency, and the power factor of the permanent magnet synchronous motor are high is a relatively expensive price, and devices for driving and an operation have to be additionally purchased because a line-start is not impossible.

Accordingly, development of a motor that allows the output density, the efficiency, and the power factor of the permanent magnet synchronous motor while allowing a line-start is very meaningful.

Preceding studies for developing an LSPMSM that allows a line-start have recently been made, and a representative technology is an induction operative permanent magnet synchronous motor.

The induction operative permanent magnet synchronous motor is a combination of a permanent magnet synchronous motor that does not allow a line-start and an operation technology of an induction motor, and is driven in an induction motor scheme and operated in a scheme of a permanent magnet synchronous motor.

However, the structure of the induction operative permanent magnet synchronous motor is complex and devices (aluminum bars or copper bars) for induction driving, which are inserted into the rotor, disturb magnetic fields of the permanent magnets so that the induction operative permanent magnet synchronous motor has not been public.

However, the rotating device that minimizes cogging torque according to the inventive concept and the permanent magnet motor and the permanent magnet generator that satisfy the pitch, the winding method, and the winding specifications according to the inventive concept at the same time may achieve both an advantage of a line-start of an induction motor and an advantage of a high output density, a high efficiency, and a high power factor of a permanent magnet synchronous motor at the same time in the same structure as that of the permanent magnet synchronous motor.

Accordingly, the permanent magnet motor suggested by the inventive concept may be widely utilized in the field of an induction motor and in the field of a permanent magnet synchronous motor.

Because the generator and the motor including the permanent magnet rotating device that minimizes cogging torque according to the inventive concept has a very low driving torque, they may be driven with a weak force.

Accordingly, when the generator of the inventive concept is mounted on a wind power generator, driving wind speed may be lowered to not more than 1 m/s, and when it is applied to a permanent magnet motor, cogging torque and torque ripples may be minimized even at a high speed, and an LSPM synchronous motor that may be driven and operated without using a driver or an inverter may be realized.

Further, in the permanent rotating device developed by the combination of the number of poles and the number of slots, and the ratio of the spacing distance between the magnets to the width of the lower ends of the teeth according to the inventive concept, the permanent magnets and the slots are arranged in a straight line without skewing, and accordingly, cogging torque may be minimized without decreasing the output and the efficiency of the generator or the motor.

Further, because additional machining, such as skewing or tooth machining, is not necessary, cogging torque may be minimized without increasing manufacturing costs.

Further, because cogging torque may be minimized regardless of apertures and magnetic flux density, a thick permanent magnet may be used or the apertures may be minimized so that the permanent magnet motor and the generator according to the inventive concept may be small-sized and light-weighted as compared with the conventional motor and the conventional generator.

The inventive concept is not limited by the detailed description, the usages, and the drawings, but various corrections and modifications made by an ordinary person in the art without departing from the spirit and the areas of the inventive concept, which are claimed in the claims, also pertain to the scope of the inventive concept.

What is claimed is:

1. A rotating device comprising:
   a stator core having a plurality of slots, the plurality of slots being disposed on an inner circumference of the stator core;
   a rotor;
   coils of a plurality of phases, the coils being wound on the plurality of slots of the stator core; and
   a plurality of permanent magnets disposed on the rotor,
   wherein an angle between a first group of neighboring slots each of which is wound by a first coil of a first phase and also successively wound by a second coil of the first phase and a second group of neighboring slots each of which is wound by a third coil of the first phase and also successively wound by a fourth coil of the first phase is 180° on the inner circumference of the stator core,
   wherein an angle between the first group and a third group of neighboring slots each of which is wound by a fifth coil of a second phase and also successively wound by a sixth coil of the second phase is 60° on the inner circumference of the stator core,
   wherein a spacing distance between the plurality of permanent magnets is not less than 70% and not more than 130% of a width of lower ends of the stator core,
   wherein a ratio of the spacing distance of the plurality of permanent magnets to the width of the lower ends of the stator core is 1:1,
   wherein a number of poles of the plurality of permanent magnets and a number of the plurality of slots satisfy Equation 1:

$P=S/3-2$, where $P$ is the number of poles, and $S$ is the number of slots, and wherein a number of turns of the coils of the plurality of phases satisfies Equation 2:

Number of turns (of winding)={rated voltage ($Vac$)× $K$}/{angular speed (rad/$s$)×magnetic flux density ($T$)}/number ($S$) of slots of stator corer/length ($mm$) of stack of stator core, where $K$ is a constant and is a value ranging from 0.84 to 1.56.

2. The rotating device of claim 1, wherein the coils of the plurality of phases are wound such that a pitch of the coils is 5 and a rated current per a cross-sectional area of 1 mm² of the coils of the plurality of phases is 6A.

3. The rotating device of claim 1, wherein a value of K is 1.2.

4. A permanent magnet type power generator comprising the rotating device of claim 1.

5. A permanent magnet type motor comprising the rotating device of claim 1.

* * * * *